United States Patent [19]

Ing-Kai

[11] Patent Number: 5,907,668
[45] Date of Patent: May 25, 1999

[54] COLOR GRAPHIC AND TEXTURE DATA TRANSMISSION AND DUPLICATION SYSTEM

[76] Inventor: Huang Ing-Kai, 6F, No.16, Lane 135, Alley 118, Wu Hsing Street, Taipei, Taiwan

[21] Appl. No.: 08/681,973

[22] Filed: Jul. 30, 1996

[51] Int. Cl.⁶ .............................. H01J 13/00; G06F 15/00
[52] U.S. Cl. ................ 395/114; 395/200.01; 395/200.02
[58] Field of Search ...................... 395/111, 114, 395/154, 162, 200.02, 200.05, 200.11, 200.01, 200.2; 358/442, 498

[56] References Cited

U.S. PATENT DOCUMENTS

| | | | |
|---|---|---|---|
| 4,652,933 | 3/1987 | Koshiishi | 358/256 |
| 4,723,172 | 2/1988 | Matsumoto | 358/498 |
| 5,285,271 | 2/1994 | Gennetten | 358/500 |
| 5,630,060 | 5/1997 | Tang | 395/200.01 |
| 5,644,625 | 7/1997 | Solot | 379/88 |

*Primary Examiner*—Jerome Grant, II
*Attorney, Agent, or Firm*—Rosenberg, Klein & Bilker

[57] ABSTRACT

A color graphic and texture data transmission and duplication system based on the methods and structures of computer structure, central processing unit, data communication, ink-jet printing, embedded circuit, firmware, dual bus, parallel transmission, ASIC, cell active, pin sharing, to achieve the functions of color scanning, fax transmitting, fax receiving, document duplicating, and data printing.

1 Claim, 1 Drawing Sheet

COLOR GRAPHIC AND TEXTURE DATA TRANSMISSION AND DUPLICATION SYSTEM

BACKGROUND OF THE INVENTION

The present invention relates to a color graphic and texture data transmission and duplication system which achieves the functions of fax transmission, fax receiving, scanning, duplication, printing, and data communication.

Since the rising of the general mood of SOHO (small office & home office), the demand for office automation machines such as fax machines, scanners, duplicators, printers, etc., has been continuously increased. These office automation machines are expensive, operated separately. When several office automation machines are used, much installation space is needed. Further, because regular G4 color fax machines are very expensive, they cannot be popularly accepted.

SUMMARY OF THE INVENTION

The present invention has been accomplished to provide a color graphic and texture data transmission and duplication system which achieves the functions of fax transmission, fax receiving, scanning, duplication, printing, and data communication. According to the present invention, the color graphic and texture data transmission and duplication system is constructed based on the methods and structures of computer structure, central processing unit, data communication, ink-jet printing, embdded circuit, firmware, dual bus, parallel transmission, ASIC, cell active, pin sharing, to achieve the functions of color scanning, fax transmitting, fax receiving, document duplicating, and data printing.

DETAILED DESCRIPTION OF THE PREFERRED EMBODIMENT

Figure 1:
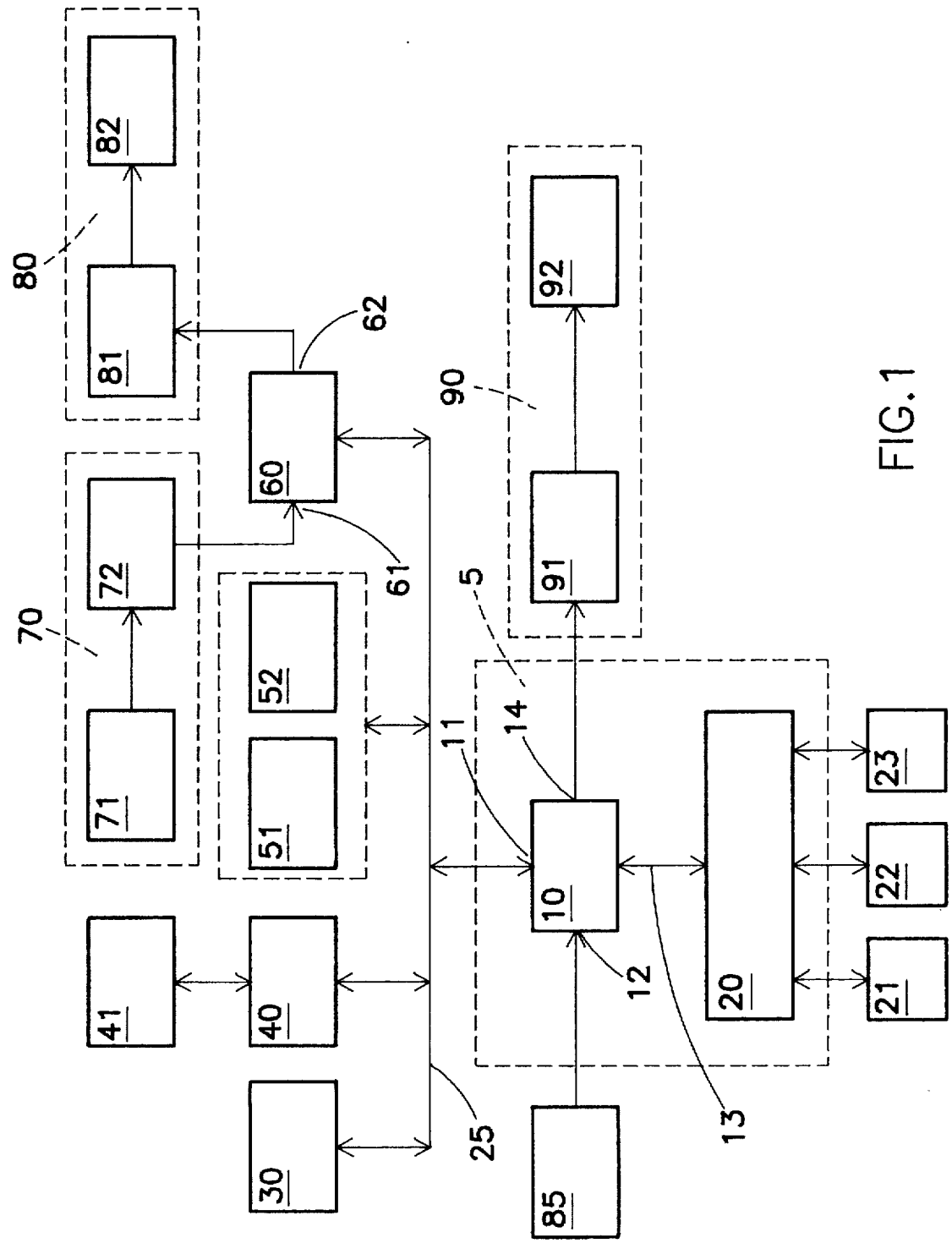
FIG. 1 is a block diagram of the present invention, showing the hardware arrangement of the color graphic and texture data transmission and duplication system.

Referring to FIG. 1, a color graphic and texture data transmission and duplication system in accordance with the present invention is generally comprised of a CPU (central processing unit) 5, a peripheral bus 25, a memory 30, a data communication device 40, a telephone line connector 41, a face panel interface 50, a time sequence and system controller 60, a scanner 70, a printer 80, a detecting circuit 85, and a paper feeder 90. The CPU 5 is connected to the peripheral bus 25 through a peripheral bus control 11. The output end of the detecting circuit 85 is connected to the input end 12 of the CPU 5. The output end 14 of the CPU 5 is connected to the input end of the paper feeder 90. The peripheral bus 25 is connected to bus input/output ports of the memory 30, the data communication device 40, the face panel interface 50, and the time sequence and system controller 60.

The CPU 5 is designed on the basis of embedded structure of technology, comprised of a microprocessor 10, a computer interface controller 20, and an internal bus 13. The microprocessor 10 is connected to the computer interface controller 20 through the internal bus 13. The peripheral bus control 11, the input end 12, and the output end 14 form the input and output of the CPU 5. The CPU 5 achieves the functions of program execution, bus control, system control, paper feed control, data processing and communication, etc. The function of data processing and communication is to compress and decompress data, to execute flow control and protocol conversion, etc. The interface standard of data communication for black and white document adopts G3 INTERFACE AGREEMENT defined by CCITT (International Telegraph and Telephone Consultative Committe. The data communication method for color document is based on the flow of T.30/T.4 defined by CCITT to match with JPEG (Journal Professional Engineer Group's data compression and decompression.

The program to be executed by the CPU 5 is programmed in the microprocessor 10 through a firmware control method and firmware control structure. A PROM (programmable read only memory) may be added to the CPU 5. When a PROM is built in the CPU 5, the program can be programmed in the PROM.

The memory 30 is provided for storing data and program during the execution of the CPU's program.

The data communication device 40 is connected to the telephone line connector 41 and acts as a data pump.

The face panel interface 50 provides the necessary user interface, comprised of a keyboard 51 and a liquid crystal display 52. The user gives the command through the keyboard 51, and the operation status is shown through the liquid crystal display 52.

The time sequence and system controller 60 is based on the structure and technology of ASIC (Application Specific Integrated Circuit), pin sharing, and cell active, i.e., the time sequence and system controller 60 is a chip of highly integrated circuit comprised of a quartz oscillator, a logic circuit, and an input/output control. The input end 61 and output end 62 of the time sequence and system controller 60 are made subject to a pin sharing and cell active technology, so that the number of contact pins is minimized. This design diminishes the size of the time sequence and system controller 60, and reduces its manufacturing cost. The switching of the input end 61 and output end 62 of the time sequence and system controller 60 is controlled by the CPU 5.

The peripheral bus 25 and the internal bus 13 form a dual bus. The microprocessor 10 controls the peripheral bus 25 through the peripheral bus control 11, and controls the computer interface controller 20 through the internal bus 13. The peripheral bus 25 and the internal bus 13 are arrangement for parallel transmission. The dual bus and parallel transmission of the present invention greatly saves CPU time, and therefore the transmission efficiency is greatly improved.

The computer interface controller 20 and the data communication device 40 are provided for data communication. The input and output of the computer interface controller 20 are achieved through a parallel port 21, a SCSI port 22, an IDE port 23, and the aforesaid internal bus 13. The parallel port 21, the SCSI port 22, and the IDE port 23 are based on a programmable, cell active, and pin sharing structure and technology. Normally, only the parallel port 21 and the SCSI port 22 are provided. When the IDE port 23 is to be used, the setting can be changed through the keyboard 51 so as to provide the parallel port 21 and the IDE port 23. When the microprocessor 10 receives the command, the pin assignment of the SCSI port 22 is defined for the IDE port 23. The application of the programmable, cell active, and pin sharing structure and technology greatly simplifies the layout of the circuit board, and reduces the cost.

The control of the feeding of fax document and paper is a feedback control. When the detecting circuit 85 detects the registration signal of document or printing paper, it provides a signal to the input end 12 of the microprocessor 10 for processing by the microprocessor 10, and the processed control signal is then transmitted through the output end 14 to the motor control circuit 91 of the paper feeder 90, causing it to drive the motor 92 of the paper feeder 90 to feed document or printing paper. The new registration signal is continuously detected by the detecting circuit 85 and transmitted to the input end 12 of the microprocessor.

The scanning, duplicating, and printing functions are achieved through the time sequence and system controller 60, the scanner 70, and the printer 80. The scanner 70 is comprised of a color scanning mechanism 71, and a scanning control circuit 72. The color scanning mechanism 71 is comprised of a color CCD (charge couple device); Alternatively, color CIS (contact image sensor) may be used for making the color scanning mechanism 71. The printer 80 is comprised of a printing circuit 81, and a printing head 82. The printing head 82 can be a black ink-jet printing head or color ink-jet printing head as desired. If the printing head 82 is a black ink-jet printing head, only black-and white document can be duplicated and printed. If the printing head 82 is a color ink-jet printing head, color document can be duplicated and printed. The printing head 82 may be variously embodied, for example, it can be a thermal printing head or dot matrix printing head.

During the scanning mode, the scanner 70 scans document, and converts the scanned optical signal into corresponding electronic digital data, then the time sequence and system controller 60 transmits the digital data through the peripheral bus 25 to the CPU 5 for processing. The processed data is then stored by the CPU 5 in the memory 30. When the scanning of the whole page of document is completed, the memory 30 sends the data to the CPU 5 through the peripheral bus 25 subject to the command of the CPU 5, permitting the data to be sent out through the parallel port 21, and the SCSI port 22 or IDE port 23.

During the fax transmission mode, the scanner 70 scans document, and converts the scanned optical signal into corresponding electronic digital data, then the time sequence and system controller 60 transmits the digital data through the peripheral bus 25 to the CPU 5 for processing, and then the processed data is stored by the CPU 5 in the memory, and then transmitted to the data communication device 40 through the peripheral bus 25 for further transmission to a public network. The CPU 5 simultaneously executes flow control.

During the fax receiving mode, the remote fax signal is transmitted from the public network to the telephone line connector 42 and fax modem 41 of the communication device 40. The fax modem 41 sends the received digital data through the peripheral bus 25 to the CPU 5, permitting it to be stored in the memory 30, and then sent through the peripheral bus 25 to the time sequence and system controller 60, permitting it to be printed out through the printer 80. At the same time, the CPU 5 executes the flow control.

During the duplication mode, the scanner 70 scans document, and converts the scanned optical signal into corresponding electronic digital data, then the time sequence and system controller 60 transmits the digital data through the peripheral bus 25 to the CPU 5 for processing, and then the processed data is transmitted to the time sequence and system controller 60 through the peripheral bus 25, and then the processed data is duplicated through the printer 80.

During the printing mode, signal is transmitted through the parallel port 21 and the SCSI port 22 or IDE port 23 to the CPU 5 for processing, and the processed data is then transmitted from the CPU 5 through the peripheral bus 25 to the time sequence and system controller 60, and then printed out through the printer 80.

It is to be understood that various modifications and changes could be made there unto without departing from the spirit and scope of the invention disclosed.

What the invention claimed is:

1. A color graphic and texture data transmission and duplication system, comprising:

- a CPU (central processing unit) adapted for executing a program to process at least two different electrical signals, said CPU including a microprocessor, a computer interface controller, and an internal bus coupling said microprocessor to said computer interface controller, for executing the functions of program execution, bus control, interface conversion, paper feed control. data processing, and communication, said computer interface controller including a parallel port, a SCSI port, and an IDE port for communication with external computers, said parallel port, said SCSI port, and said IDE port being formed of a programmable, cell active, and pin sharing structure;
- a firmware control structure for storing said program, said program being executed by said CPU being programmed in said microprocessor through a firmware control method;
- a peripheral bus connected to said CPU;
- a memory connected to said peripheral bus for storing data and a program for operation of said CPU;
- a scanner for converting color graphic and texture image data into an electrical signal;
- a printer for converting said electrical signal into color graphic and texture image data; and
- a data communication device connected to a telephone line network and having a data pump.

* * * * *